US008019221B2

(12) United States Patent
Zancewicz

(10) Patent No.: US 8,019,221 B2
(45) Date of Patent: Sep. 13, 2011

(54) SYSTEMS AND METHODS FOR BROADBAND TRANSMISSION OF SIGNALS

(75) Inventor: Gregory J. Zancewicz, Melissa, TX (US)

(73) Assignee: Zoran Corporation, Sunnyvale, CA (US)

( * ) Notice: Subject to any disclaimer, the term of this patent is extended or adjusted under 35 U.S.C. 154(b) by 852 days.

(21) Appl. No.: 11/833,087

(22) Filed: Aug. 2, 2007

(65) Prior Publication Data

US 2009/0034979 A1 Feb. 5, 2009

(51) Int. Cl.
*H04J 14/00* (2006.01)

(52) U.S. Cl. ............. 398/72; 398/69; 398/71; 398/164; 398/115; 398/100; 725/38; 725/105; 725/106; 725/125; 725/127; 455/5.1; 455/6.1; 455/4.2; 370/352; 370/401; 370/535; 370/389; 370/392

(58) Field of Classification Search .................. 398/66, 398/67, 68, 69, 70, 71, 72, 73, 74, 75, 76, 398/77, 78, 79, 59, 98, 99, 100, 115, 116, 398/117, 118, 163, 182, 183, 202, 208, 209, 398/187, 101, 164; 725/105, 106, 125, 126, 725/127, 129, 38; 455/609, 610, 608, 617, 455/5.1, 4.2, 6.1; 370/535, 537, 352, 401, 370/389, 465, 392

See application file for complete search history.

(56) References Cited

U.S. PATENT DOCUMENTS

| | | | | |
|---|---|---|---|---|
| 5,659,351 | A * | 8/1997 | Huber | 725/101 |
| 6,850,710 | B1 * | 2/2005 | Mells | 398/163 |
| 7,099,295 | B1 | 8/2006 | Doyle et al. | |
| 7,209,497 | B2 * | 4/2007 | Weinstein et al. | 370/535 |
| 7,359,392 | B2 | 4/2008 | Bianchi et al. | |
| 7,428,238 | B2 | 9/2008 | El Wardani et al. | |
| 7,466,919 | B1 * | 12/2008 | Birk et al. | 398/71 |
| 2003/0031191 | A1 | 2/2003 | El Wardani et al. | |
| 2004/0141747 | A1 * | 7/2004 | Kenny et al. | 398/71 |
| 2005/0063424 | A1 | 3/2005 | Weinstein et al. | |
| 2006/0256009 | A1 | 11/2006 | Wengler et al. | |
| 2007/0212073 | A1 * | 9/2007 | Kikushima et al. | 398/79 |
| 2008/0247541 | A1 | 10/2008 | Cholas et al. | |

FOREIGN PATENT DOCUMENTS

| | | |
|---|---|---|
| EP | 1 770 887 | 4/2007 |
| EP | 1 777 960 | 4/2007 |
| JP | 07 170244 | 7/1995 |

OTHER PUBLICATIONS

International Search Report and Written Opinion issued for PCT/US2008/071169 dated Nov. 6, 2008, 11 pgs.

* cited by examiner

*Primary Examiner* — Hanh Phan

(74) *Attorney, Agent, or Firm* — Fulbright & Jaworski L.L.P.

(57) ABSTRACT

Systems and methods which facilitate broadband transmission of signals using a delivery point tuning technique to provide a extended frequency passive optical network (EF-PON) are shown. Embodiments provide an extended frequency optical transition node (EF-OTN) at each of a plurality of delivery points to provide a frequency translation interface between equipment disposed at the delivery point locations and a network utilizing transmission bandwidth which is incompatible with that equipment. The foregoing frequency conversion is preferably transparent to the equipment receiving the network transmissions. Embodiments utilize a single wideband tuner for providing frequency conversion with respect to a plurality of equipment disposed a delivery point. Network head-end modulators are controlled to implement channel grouping such that the signals requested by each piece of subscriber equipment at a delivery point are placed within radio frequency (RF) channels so that each such signal is within the frequency converted band of an EF-OTN tuner.

40 Claims, 5 Drawing Sheets

SYSTEMS AND METHODS FOR BROADBAND TRANSMISSION OF SIGNALS

CROSS-REFERENCE TO RELATED APPLICATIONS

The present application is related to co-pending and commonly assigned U.S. patent application Ser. No. 11/738,825 entitled "Highly Integrated Television Tuner on a Single Microcircuit," filed Apr. 16, 2007, Ser. No. 11/486,706 entitled "Broadband Integrated Tuner," filed Jun. 29, 2006, and Ser. No. 10/952,185 entitled "System and Method of Eliminating or Minimizing LO-Related Interference from Multiple Tuners," filed Sep. 28, 2004, the disclosures of which are incorporated herein by reference.

TECHNICAL FIELD

The invention relates generally to signal transmission and, more particularly, to broadband transmission of signals.

BACKGROUND OF THE INVENTION

Broadcast of television signals via cable distribution systems has been provided for a number of years. The number of channels transmitted has continued to increase over time. In recent years, the need for transmission bandwidth in the networks has not only been due to increasing television channel availability, but has also been driven by new technologies and uses. For example, broadband data transmission for transferring large amounts of information between computer systems, such as through the use of cable modems, has become common. Additionally, services such as digital voice transmission (e.g., voice over Internet protocol (VoIP)) have gained widespread acceptance, and thus create additional demand on network transmission bandwidth. Likewise, services such as video on demand have created additional demand for network transmission bandwidth.

Accordingly, network operators have periodically replaced network infrastructure (e.g., modulators, transmission cables, splitters, amplifiers, etc.) and subscribers have replaced subscriber equipment (e.g., set-top boxes, television sets, etc.) to accommodate the transmission and reception of increased numbers of channels. For example, in order to provide transmission of increasing numbers of channels cable networks have progressed through 330 MHz transmission bandwidth, 550 MHz transmission bandwidth, 750 MHz transmission bandwidth, to 870 MHz transmission bandwidth. Some cable networks presently provide as much as 1 GHz transmission bandwidth.

Replacing network infrastructure is time consuming and costly. Accordingly, network operators are often reluctant to make changes in order to provide increased transmission bandwidth. Moreover, the time and cost associated with upgrading network infrastructure is generally not the greatest impediment to implementing increased transmission bandwidth. Network infrastructure generally serves multiple subscribers, such as on the order of one device serving 32-1000 subscribers in many cases. However, subscriber equipment, such as set-top boxes or television tuners, serve a single subscriber. Therefore, network transmission bandwidth increases which implicate subscriber equipment is even more time consuming and costly than replacing network infrastructure. That is, each individual piece of subscriber equipment would require replacement or upgrading in order to implement the network transmission bandwidth increase.

At least in part for the foregoing reasons, network operators have been reluctant to implement network transmission bandwidth increases beyond 1 GHz. Instead of implementing transmission bandwidth increases, many network operators have implemented techniques for providing increased data throughput via the same network transmission bandwidth. For example, analog television channels, which previously each required 6 MHz bandwidth radio frequency (RF) channels for transmission, have been digitally encoded and compressed such that a single 6 MHz bandwidth RF channel carries a plurality of logical channels (e.g., 10 of the foregoing digitized and compressed television channels). Likewise, some network operators have implemented switched digital video (SDV) systems wherein on the RF (e.g., television) channels containing programming currently requested or in use by subscribers within a particular transmitter's service area are transported over that particular transmitter, to thereby utilize network bandwidth more efficiently.

BRIEF SUMMARY OF THE INVENTION

The present invention is directed to systems and methods which facilitate broadband transmission of signals using a delivery point tuning technique. Embodiments of the invention provide an extended frequency optical transition node (EF-OTN) at each of a plurality of delivery points (e.g., subscriber sites) to provide an interface between equipment (e.g., subscriber equipment) disposed at the delivery point locations and a network utilizing transmission bandwidth which is incompatible with that equipment. For example, a passive optical network (PON) may be utilized to provide 2 GHz network transmission bandwidth, although typical subscriber equipment is capable of tuning to frequencies associated with 870 MHz or 1 GHz network transmission bandwidths. Accordingly, an EF-OTN of all embodiment of the invention may be disposed at the delivery points in order to down convert signals desired by equipment at the location of the delivery point to frequencies compatible with that equipment.

Signals transmitted via networks adapted according to embodiments of the invention may comprise a variety of signal types and/or protocols, such as broadcast signals (e.g., television transmissions for receipt by all subscribers on the network), narrowcast signals (e.g., switched digital video (SDV) and/or video on demand transmissions for receipt by select subscribers), near video on demand signals (e.g., pay-per-view transmissions), data signals (e.g. point-to-point and/or point-to-multipoint computer data transmission) audio signals (e.g., voice over Internet protocol (VoIP) transmissions), streaming media signals (e.g., interactive multimedia streams), etc. Equipment (e.g., subscriber equipment) coupled to networks adapted according to embodiments of the invention may comprise a variety of equipment types and configurations, such as television sets, set-top boxes, computers, personal digital assistants (PDAs), telephones, etc.

In operation according to preferred embodiments, the foregoing frequency conversion is transparent to the equipment receiving the network transmissions. For example, subscriber equipment designed to operate with respect to 1 GHz network transmission bandwidths will operate as if the equipment is coupled to a 1 GHz network although the actual network is utilizing 2 GHz network transmission bandwidths through use of an EF-OTN of an embodiment of the invention. Accordingly, embodiments of the invention operate to transmit more channels on a network in a way that is transparent to subscriber equipment.

Embodiments of the present invention utilize a single wideband tuner for providing frequency conversion with respect to a plurality of equipment disposed a delivery point. For example, network head-end modulators are controlled to place the signals or data streams requested by each piece of subscriber equipment at a delivery point within one or more radio frequency (RF) channels disposed in the transmitted spectrum so that each such data stream is within the frequency converted band of an EF-OTN tuner (referred to herein as channel grouping). Embodiments of the invention utilize a 100 MHz bandwidth tuner (i.e., a tuner providing frequency conversion of a 100 MHz band of frequencies) as an EF-OTN tuner. Such a liner configuration is sufficiently wideband to optimize the ability to modulate multiple data streams for use at a delivery point within the tuner's bandwidth, and yet not so wideband as to present unacceptable operating performance, such as unacceptably high power consumption and non-linearity across the bandwidth.

The use of a plurality of logical channels modulated in each RF channel facilitates the ability of head-end equipment modulating data streams for multiple subscriber sites, wherein each subscriber site has multiple subscriber equipment associated therewith, within one or more RF channel disposed in the spectrum so as to be within the frequency converted band of an EF-OTN tuner. Accordingly, embodiments of the invention are implemented with respect to digitally encoded data streams within logical channels of an RF channel. Additionally, the use of subscriber equipment adapted for use with switched digital video (SDV) facilitates the ability to utilize EF-OTN frequency conversion and channel conversion transparently, without necessitating replacement or upgrading of legacy subscriber equipment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

To aid in understanding the concepts of the present invention, a brief discussion of currently implemented broadband signal transmission networks is provided below. It should be appreciated that the networks shown and described, including the networks implementing embodiments of the present invention, are highly simplified (such as by illustrating only a single delivery point or subscriber site) to provide a more readily understandable illustration.

Figure 1:
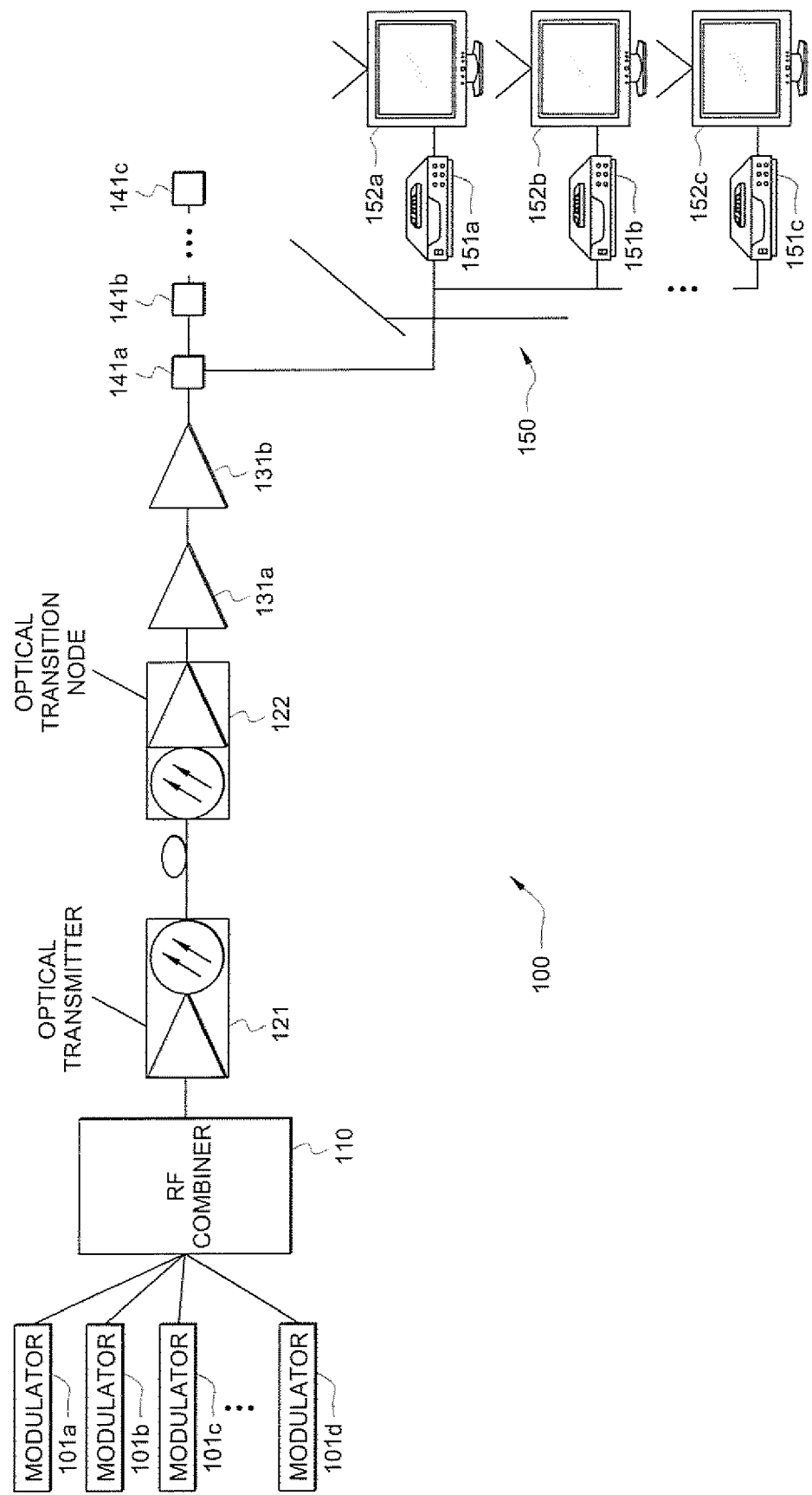
FIG. 1 shows a prior art hybrid fiber-coax (HFC) network.

Directing attention to FIG. 1 a conventional hybrid fiber-coax (HFC) network is shown. HFC network 100 of FIG. 1 provides a broadcast architecture for broadcast transmission of approximately 1 GHz bandwidth. That is, HFC network 100 can broadcast up to 155 channels modulated in 6 MHz bands from 54 MHz to 1 GHz. Accordingly, HFC network 100 includes modulators 101a-101d each producing an output in the 54-1000 MHz band. The signals modulated by modulators 101a-101d may comprise analog signals (e.g., 1 analog signal per 6 MHz radio frequency (RF) channel) or digital signals (e.g., 10 digital signals, in 10 logical digital channels, per 6 MHz RF channel). Regardless of what type of signals are modulated, the modulation scheme implemented by HFC network 100 operates to place particular content (e.g., the broadcast signal of a particular broadcasting company) at a same point in the spectrum to enable subscriber equipment to identify and select content for demodulation.

HFC network 100 includes RF combiner 110 coupled to modulators 101a-101d. RF combiner 110 operates to multiplex the outputs of the modulators into a broadband RF network signal for transmission via coaxial cable network links. Optical transmitter 121, such as may comprise an amplitude modulated (AM) optical transmitter operating in the 1310 nm or 1550 nm wavelength ranges, operates to convert the RF network signal to an optic network signal for transmission via fiber-optic network links. Although converting the transmitted bandwidth to optical frequencies, optical transmitter 121 continues to transmit a bandwidth of approximately 1 GHz.

Optical transition node (OTN) 122 is coupled to a fiber-optic network link and operates to recover the 54-1000 MHz RF signals. These RF signals are transmitted through a coaxial cable delivery network portion. The coaxial cable delivery network portion illustrated in FIG. 1 includes amplifiers 131a and 131b to maintain signal levels throughout the coaxial delivery network portion and passive RF taps 141a-141c for "dropping" cables to various delivery points. Although only a single delivery point (i.e., subscriber site 150) is shown in FIG. 1, the coaxial cable delivery network portion of such HFC networks would typically provide service to hundreds of delivery points (e.g., 500-2000). The HFC network may include a plurality of coaxial cable delivery network portions, all of which delivery the same broadcast signal lineup.

Subscriber site 150 includes a plurality of equipment, shown here as set-top boxes 151a-151c coupled to televisions 152a-152b. Although a single type of equipment is shown at the delivery point illustrated in FIG. 1, various types of equipment may be used, such as computers, voice over internet protocol (VoIP) telephones, etc.

As can be seen from the system illustrated in FIG. 1, HFC networks present transmission bandwidth limitations in that any channel modulated by modulators 101a-101d must have a unique portion of the spectrum reserved for broadcast of that signal throughout the network. Accordingly, although a subscriber at subscriber site 150 may not subscribe to a signal modulated by modulator 101*d*, for example, the spectrum in the transmission bandwidth used to transmit this signal to other subscribers remains unavailable for use by the subscriber at subscriber site 150. It can readily be appreciated that as the number of signals that any particular subscriber does not utilize increases, the transmission bandwidth available for use by that subscriber decreases.

Figure 2:
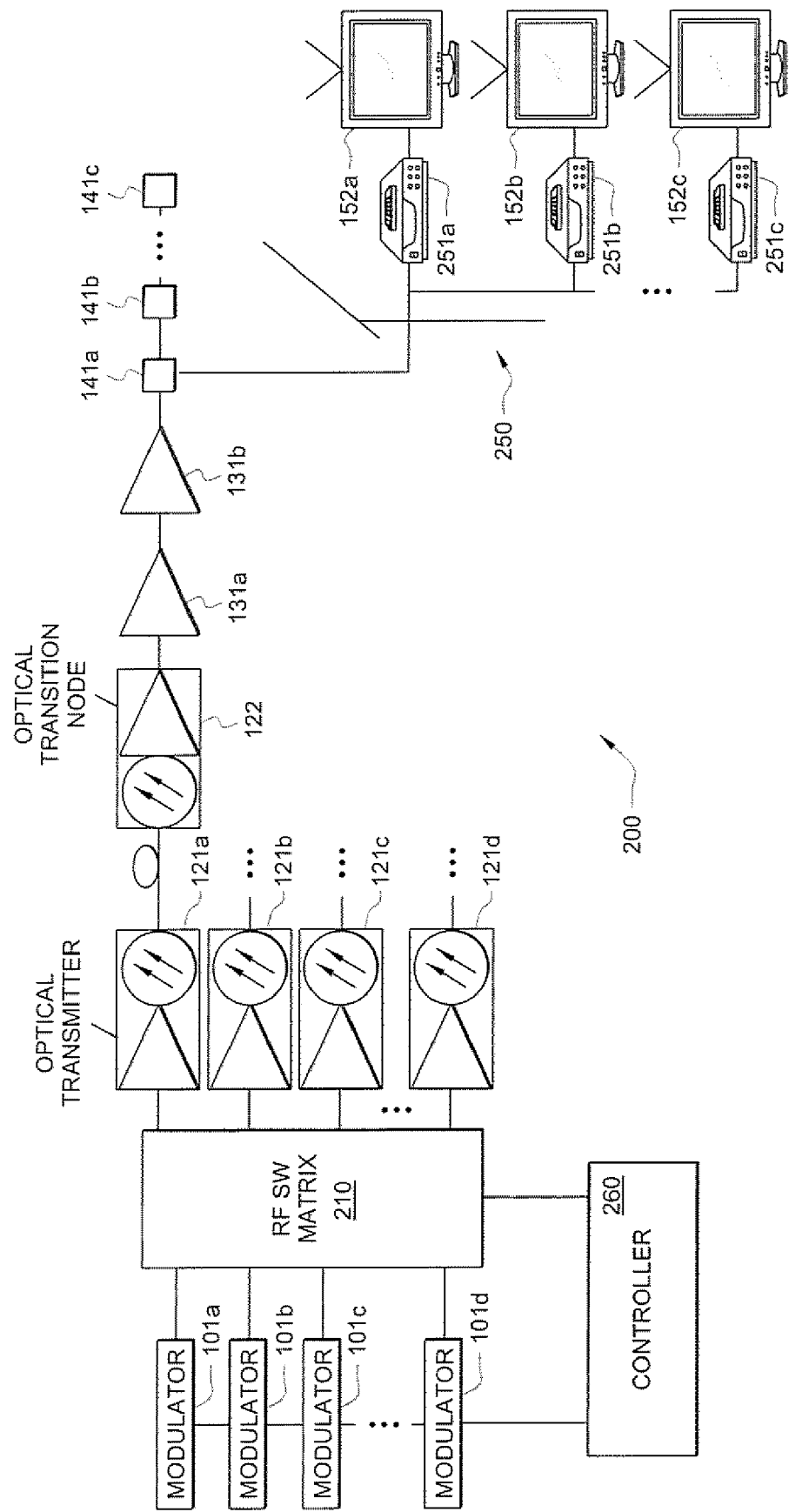
FIG. 2 shows a prior art hybrid fiber-coax (HFC) network implementing switched digital video (SDV)

Directing attention to FIG. 2, HFC network 200 implementing a switched digital video (SDV) architecture to remediate the foregoing bandwidth limitations is shown. The SDV architecture of HFC network 200 is a step away from the broadcast architecture of HFC network 100 in that signals may be transmitted to subsets of delivery points (e.g., narrowcast), thereby freeing transmission bandwidth which would otherwise be unavailable for use by particular delivery points. That is, although HFC network 200 provides transmission of approximately 1 GHz bandwidth as does HFC network 100, the channels of HFC network 200 may be selectably placed in the transmission spectrum for any group of delivery points only when demand exists for the channel signals by a delivery point of a group.

HFC network 200 of FIG. 2 includes RF switch matrix 210 selectively coupling RF channel outputs of modulators 101*a*-101*d* to optical transmitters 121*a*-121*d*. Optical transmitters 121*a*-121*d* are each associated with a relatively small service area having a subset of the network delivery points associated therewith. Although only a single service area and single delivery point (i.e., subscriber site 250) are shown in FIG. 2, each of optical transmitters 121*a*-121*d* would serve a service area and each service area would include a plurality of delivery points coupled to the coaxial cable network portions of the network through passive RF taps 141*a*-141*c*. In the SDV architecture of HFC network 200, the coaxial cable delivery network portions of the network would typically provide service to several hundred to several thousand delivery points (e.g., 500-2000).

In operation, RF switch matrix 210 is controlled by controller 260 to couple only those RF channels containing content (e.g., programming or data) requested by delivery point equipment within a particular optical transmitter's service area to that particular one of optical transmitters 121*a*-121*d*. For example, controller 260 may receive signaling from delivery point equipment, such as through a conventional data over cable service interface specification (DOCSIS) return path, indicating various channel selections. Controller 260 may then control RF switch matrix 210 to couple the output of an appropriate one of modulators 101*a*-101*d* (i.e., the particular modulator outputting the requested signal) to an optical transmitter 121*a*-121*d* serving the equipment making the channel selection.

It should be appreciated that the particular portion of spectrum a signal may be modulated in may be varied based upon available spectrum. For example, a signal typically thought of as occupying digital logical channel 2 of RF channel 5 may not currently be selected by delivery point equipment, thereby freeing this bandwidth for use for other signal transmission. Accordingly, another signal, such as a computer data signal for reception by a cable modem or even a television signal, may be modulated for transmission in digital logical channel 2 of RF channel 5. Such selection of channel modulation schemes and control of the modulators to achieve the modulation schemes may be provided by controller 260.

Controller 260 may additionally provide signaling to the delivery point equipment for controlling their tuning to an appropriate RF channel and/or digital logical channel for a selected signal. For example, set-top boxes 251*a*-251*c* may operate to "spoof" channel selections to a user such that a user makes channel selections based upon a published channel lineup, and the set-top box displays an indication that a channel of the published channel lineup has been selected when in reality a tuner of the set-top box has tuned to an arbitrary channel used to carry the signal of the channel selected by the user as indicated by controller 260.

From the foregoing it can be seen that, although the infrastructure of HFC network 200 remains limited to transmission of approximately 155 RF channels, as was HFC network 100, through selective transmission of signals (e.g., narrowcasting of signals to select service areas) transmission bandwidth may be made available for different uses by the various delivery point equipment. This SDV architecture, therefore, increases the capacity of the HFC network by utilizing RF channels with greater efficiency, since channels having content which is not being used by delivery point equipment within a given service group are not transmitted.

Additional capacity gains have been realized through the use of a passive optical network (PON) architecture. Directing attention to FIG. 3, PON 300 implementing SDV in a PON architecture, wherein fiber-optic links are utilized up to the delivery point. The architecture of PON 300 is similar to that of HFC network 200 in that signals are transmitted to subsets of delivery points (e.g., narrowcast), thereby freeing transmission bandwidth which would otherwise be unavailable for use by particular delivery points. However, the number of deliver) points within a service area of PON 300 is typically much smaller than that of HFC network 200. For example, although only a single delivery point (i.e., subscriber site 350) is shown in FIG. 3, the optical network portion of PON 300 associated with each of optical transmitters 121*a*-121*d* would typically provide service to 50 or fewer delivery points, as compared to 500-2000 as in HFC network 200.

Figure 3:
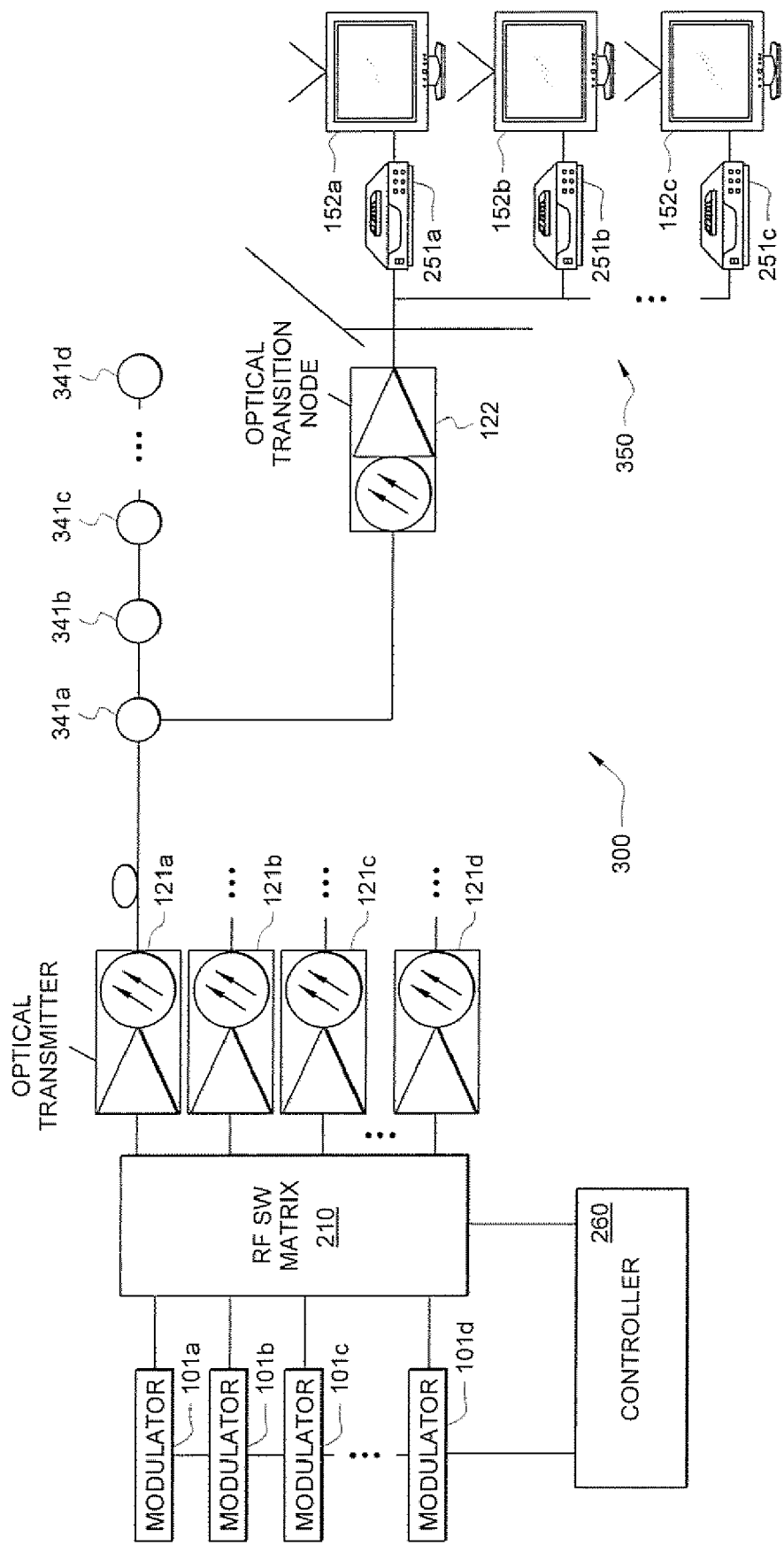
FIG. 3 shows a prior art passive optical network (PON) implementing switched digital video (SDV)

As shown in FIG. 3, optical couplers 341*a*-341*d* of PON 300 provide the fiber-optic "drops" to the foregoing delivery points. As fiber-optic links are brought to the delivery point, each delivery point of PON 300 has an OTN (e.g., OTN 122) associated therewith to recover the RF signals and place them on coaxial cable links of the delivery point. Accordingly, set-top boxes 251*a*-251*c* and televisions 152*a*-153*c* continue to operate as described above.

PON 300 provides transmission of approximately 1 GHz bandwidth as does HFC network 100 and HFC network 200. As with HFC network 200, the channels of PON 300 may be selectably placed in the transmission spectrum for any group of delivery points only when demand exists for the channel signals by a delivery point of a group. However, due to the service areas associated with each of optical transmitters 121*a*-121*d* having significantly fewer delivery points associated therewith, PON 300 may provide as much as a ten-fold increase in available capacity per delivery point over that provided by HFC network 200. That is, because there is less equipment selecting and utilizing signals transmitted by the network in each particular service area, more transmission bandwidth may be freed up using the SDV techniques described above.

It is believed by the present inventor that the foregoing network architectures are unable to meet the demand for information communication in the future. Despite even the efficiency gains provided by SDV techniques, it is believed that network operators will face a capacity shortage in the coming years due to subscriber demand for advanced services such as high-speed data, VoIP telephony, video-on-demand, etc. Conventional HFC networks and PONs, such as HFC network 100, HFC network 200, and PON 300, are currently limited to operational bandwidths of about 1 GHz due to limitations of the network infrastructure and limitations with respect to the timing ranges of existing, subscriber equipment. Although increasing the bandwidth beyond 1 GHz would require the operator to replace a relatively small number (typically 1-3 per service group) of network devices, such as optical transmitters, such an upgrade would likely require replacing all subscriber equipment (e.g., set-top boxes) in the network. Accordingly, providing increased transmission bandwidth through increasing the bandwidth beyond 1 GHz has heretofore not been a practical solution.

Figure 4:
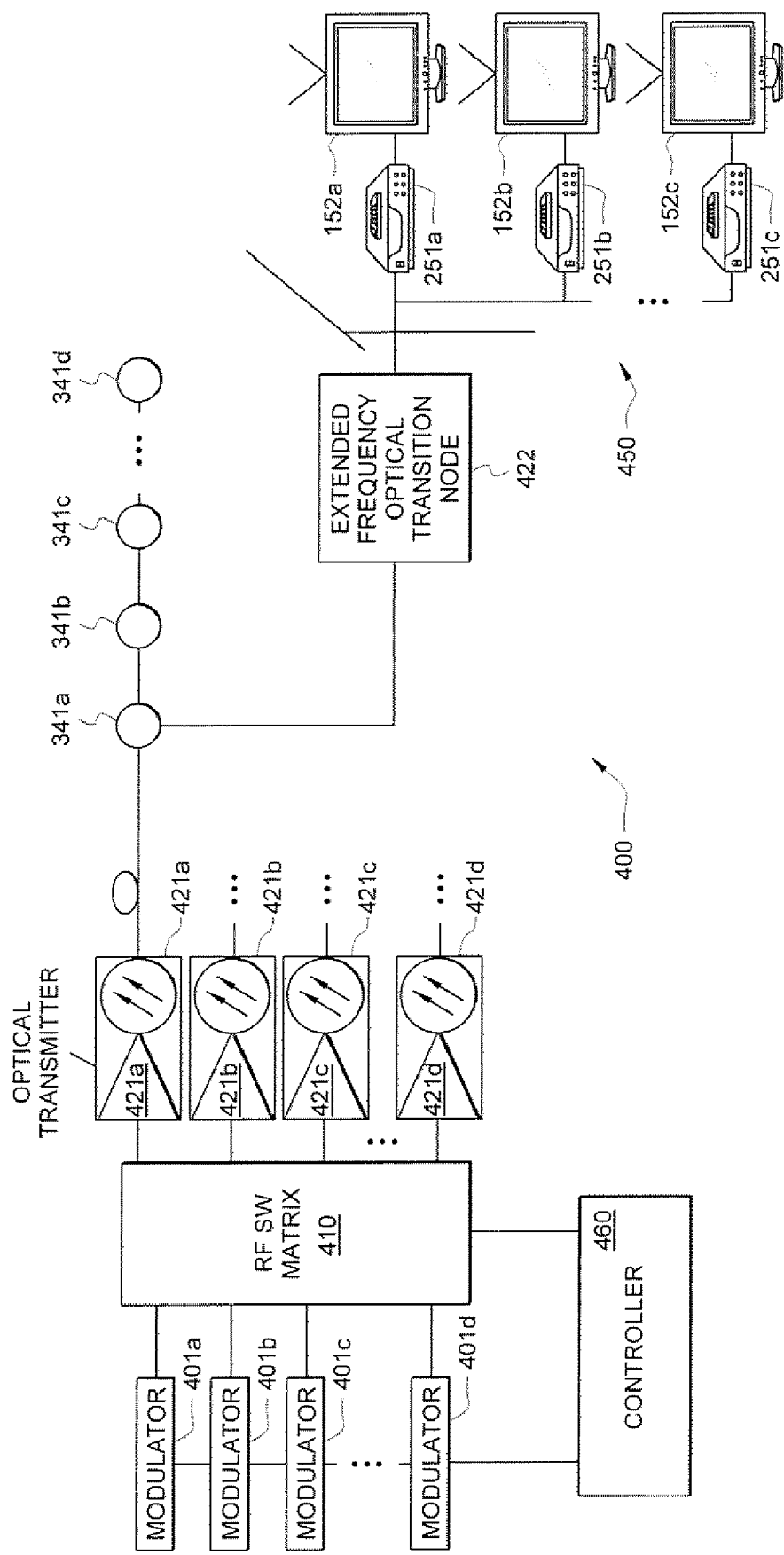
FIG. 4 shows a extended frequency passive optical network (EF-PON) of an embodiment of the present invention.

Directing attention to FIG. 4, a extended frequency passive optical network (EF-PON) architecture utilizing an operational RF frequency range beyond that directly supported by network equipment, such as set-top boxes, televisions, cable modems, etc., is shown. Specifically, EF-PON 400 of the illustrated embodiment provides for transmission of approximately 2 GHz bandwidth. That is, EF-PON 400 of an embodiment can transmit over 300 (e.g., 310) RF channels modulated in 6 MHz bands from 54 MHz to 2 GHz. As described in further detail below, extended frequency optical transition nodes (EF-OTNs) of embodiments of the present invention are utilized to recover RF channels and to place recovered RF channels in a band directly accessible by delivery point equipment. Although not shown in FIG. 4 in order to simplify the drawing, EF-PON 400 of embodiments includes a conventional return path, such as a return path operable in accordance with the DOCSIS 3.0 specifications available from CableLabs of Louisville, Colo., which are hereby incorporated herein by reference.

Modulators 401a-401d of EF-PON 400 produce outputs in the 54-2000 MHz band. Each modulator may be capable of modulating input signals to selected bands (e.g., selected RF channels) throughout the entire 54-2000 MHz range or various ones of the modulators may be capable of modulating in put signals to selected bands throughout respective portions of the 54-2000 MHz range. For example, modulators 401a and 401b may operate to modulate input signals to selected bands within the range of 54-1000 MHz whereas modulators 401c and 401d may operate to modulate input signals to selected bands within the range of 1000 MHz-2000 MHz. Of course, different divisions of transmission spectrum, whether overlapping or non-overlapping, may be associated with different ones of the modulators according to embodiments of the invention. The signals modulated by modulators 401a-401d preferably comprise digital signals, such that multiple signals are modulated in a single RF channel (e.g., 10 digital signals, in 10 logical digital channels, per 6 MHz RF channel).

According to a preferred embodiment, fiber-optic links are brought to the delivery point, and thus each delivery point of EF-PON 400 has an EF-OTN (e.g., EF-OTN 422) associated therewith. EF-OTN 422 operates to recover the RF signals, much like OTN 122 discussed above. However, rather than directly placing the recovered RF signals on coaxial cable links of the delivery point, EF-OTN 422 of embodiments provides frequency conversion to place the appropriate RF signals within a frequency range supported by delivery point equipment (e.g., set-top boxes 251a-251c and/or televisions 152a-152c). Accordingly, although EF-PON 400 provides twice the transmission bandwidth of HFC network 200 and PON 300, delivery point equipment such as set-top boxes 251a-251c and televisions 152a-153c may continue to be operated as described above.

Figure 5:
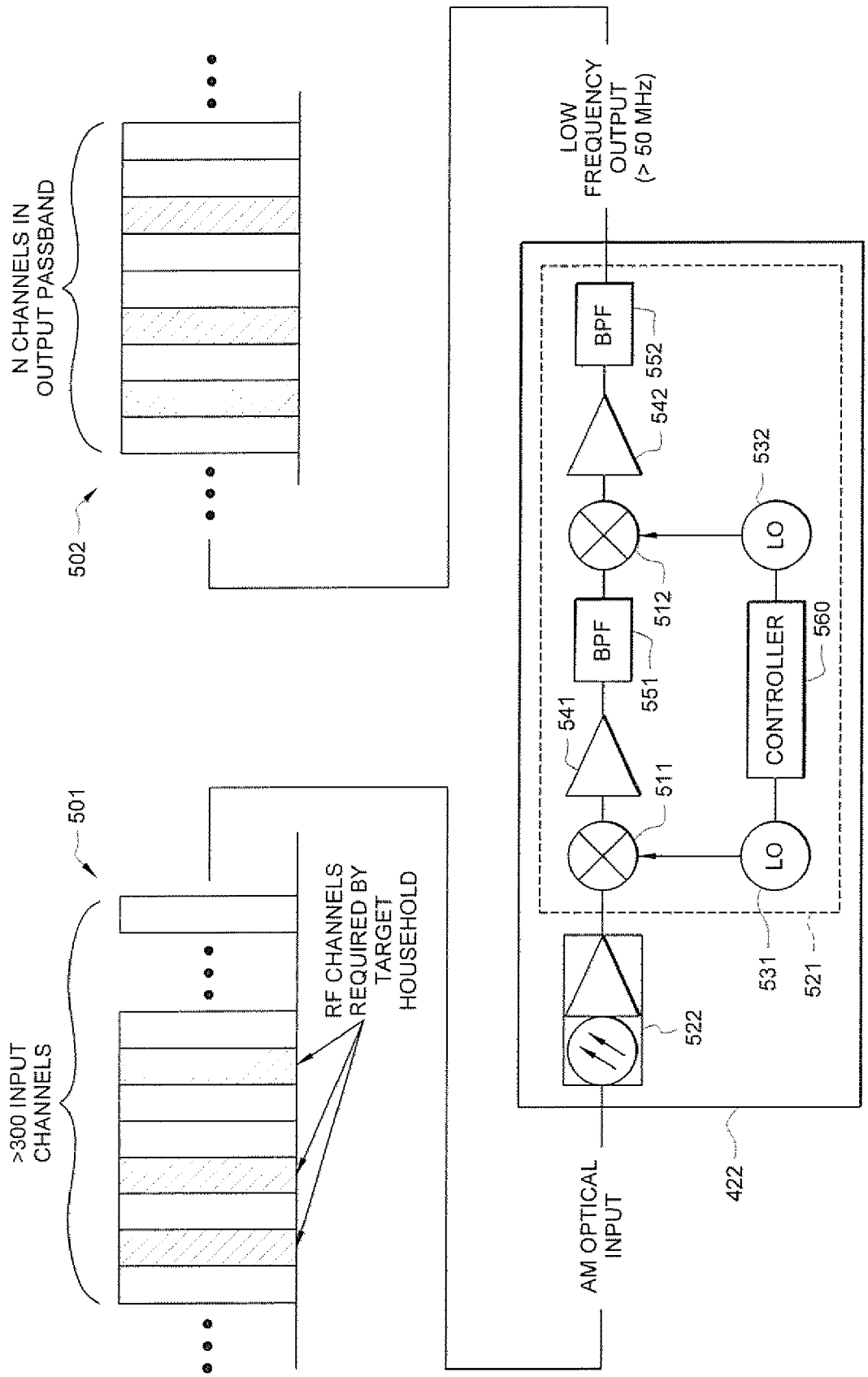
FIG. 5 shows detail of an embodiment of an extended frequency optical transition node (EF-OTN) which may be used in the extended frequency passive optical network (EF-PON) of FIG. 4.

Directing attention to FIG. 5, detail with respect to a preferred embodiment EF-OTN configuration is shown. Specifically, EF-OTN 422 of FIG. 5 includes optical transition circuit 522 and tuner circuit 521. Optical transition circuit 522, such as may comprise an OTN, provides recovery of RF signals from received optical signals. Tuner circuit 521 provides frequency translation of the recovered RF signal.

Tuner circuit 521 is preferably a relatively wideband tuner to facilitate simultaneous frequency translation of all signals selected for use by an associated delivery point. For example, a relatively wideband tuner configuration of tuner circuit 521 may provide frequency translation of a 100 MHz wide frequency band or may provide frequency translation of more than 4 RF channels simultaneously. A tuner configuration suitable for providing wideband tuning useful according to embodiments of the present invention is the MT2170 tuner available from Microtune, Inc., Plano, Tex., the assignee of the present application.

In the illustrated embodiment, tuner circuit 521 is a double conversion tuner, including mixers 511 and 512, either or both of which may comprise image reject mixers, to provide frequency translation of RF signals. For example, mixer 511 may provide up-conversion and mixer 512 may provide down-conversion, wherein the operating frequencies of local oscillators 531 and 532 are selected to convert a particular frequency band within the RF signal provided by optical transition circuit 522 (e.g., a 100 MHz bandwidth portion of the 54-2000 MHz transmission bandwidth) to a selected frequency band within the tuning range of delivery point equipment (e.g., a 100 MHZ bandwidth portion of the 54-1000 MHz equipment tuning bandwidth). As will be discussed in further detail below, controller 560 preferably operates in cooperation with controller 460 (FIG. 4) to control local oscillators 531 and/or 532 to cause EF-OTN to output RF channels carrying signals selected by delivery point equipment (e.g., set-top boxes 251a-251c) of delivery point 450 (FIG. 4) at appropriate frequency band within the tuning bandwidth of the delivery point equipment.

Tuner circuit 521 of the illustrated embodiment further includes first intermediate (IF) frequency amplifier 541 and first IF bandpass filter 551 as well as second IF amplifier 542 and second IF bandpass filter 552. First IF amplifier 541 and second IF amplifier 542 preferably each provide substantially linear operation throughout a bandwidth at least as broad as the tuning bandwidth of tuner circuit 521 (e.g., a 100 MHz bandwidth in the foregoing example). Likewise, first IF bandpass filter 551 and second IF bandpass filter 552 preferably each provide a passband at least as broad as the tuning bandwidth of tuner circuit 521.

The center frequencies of first IF bandpass filter 551 and/or second IF bandpass filter 552 may be fixed or adjustable. For example, the 100 MHz output band of tuner circuit 521 may always be provided at a predetermined range (e.g., 54-154 MHz), and thus the center frequency of second IF bandpass filter may be fixed at the center frequency of this rage (e.g., 102 MHz). However, to facilitate selection of local oscillator frequencies to avoid spurs and other undesired artifacts in the output signal, the frequency range of the first IF may be variable and thus the center frequency of first IF bandpass filter may also be adjustable (e.g., discretely switchable, continuously adjustable, etc.). Techniques for identifying particular local oscillator frequencies which minimize spurs and other undesired artifacts in the output signal are shown and described in the above referenced patent application entitled "System and Method of Eliminating or Minimizing LO-Related interference from Multiple Tuners."

The various components of EF-OTN 422 may be provided in integrated circuit implementations according to embodiments of the invention. For example, all of the components of EF-OTN 422 of the embodiment illustrated in FIG. 5 may be disposed upon a same integrated circuit, such as through use of silicon-germanium processes to facilitate the mixed optical and RF circuits. Alternatively, all or some components of tuner circuit 521 may be provided on an integrated circuit separate from optical transition circuit 522, if desired. Integrated circuit tuner configurations as may be utilized according to embodiments of the invention are shown and described in the above referenced patent applications entitled "Highly Integrated Television Tuner on a Single Microcircuit" and "Broadband Integrated Tuner."

Controller 460 (FIG. 4) preferably operates to implement a channel modulation scheme which groups signals such that RF channels carrying signals selected by the equipment disposed at a particular delivery point are disposed within a frequency range corresponding to the bandwidth of tuner circuit 521. For example, RF channels carrying three signals selected for use by set-top boxes 251*a*-251*c* of delivery point 450 may be modulated at any frequencies in the 54-2000 MHz transmission bandwidth of the above exemplary embodiment, although the signals would be modulated within RF channels disposed in the spectrum within a 100 MHz range as shown in input channels 501. It should be appreciated that although a separate RF channel is shown in input channels 501 carrying signals for each of set-top boxes 251*a*-251*c*, a plurality of such signals may be modulated in a same RF channel where channel availability allows. Controller 560, operating in accordance with information with respect to the placement of the modulated signals provided by controller 460 according to an embodiment of the invention, selects frequencies for local oscillator 531 and/or local oscillator 532 to convert a frequency band including the signals to frequencies within the tuning range of set-top boxes 251*a*-251*c* as shown in output channels 502.

In operation according to embodiments of the invention, individual subscriber equipment (e.g., one or more of set-top boxes 251*a*-251*c*) of a subscriber site (e.g., delivery point 450) will request desired content or data streams, such as through the return path channel (not shown). Controller 460 of the head-end system will preferably operate to locate logical channels of RF channels disposed within a range of frequencies of one another corresponding to the passband of EF-OT 422 (e.g. within a 100 MHz frequency range). In the example where set-top boxes 251*a*-251*c* are disposed at the subscriber site, each requesting a different signal stream, controller 460 may operate to select available logical channels within 3 different RF channels (each RF channel being within 100 MHz of the other 2 RF channels), select available logical channels within a single RF channel, or any combination of logical channels and RF channels which will dispose the selected signal streams within the passband of EF-OTN 422. For example, controller 460 may identify 3 RF channels between 1.7 GHz and 1.8 GHz having capacity (e.g., available logical channels) for carrying signals selected by set-top boxes 251*a*-251*c*.

Having selected the RF channels and logical digital channels to carry the signals, controller 460 of an embodiment operate to control ones of modulators 401*a*-401*d* having the selected signal streams as inputs thereto to modulate the signal streams within the selected digital logical channels and RF channels. Such control may include controlling switchable coupling of signal input to the modulators in order to provide desired signal stream input to an appropriate modulator. The modulated RF channels including the selected signals are preferably then switchably coupled to the appropriate optical transmitter (e.g., optical transmitter 421*a* for signals selected by set-top boxes 251*a*-251*c* of delivery point 450) through RF switch matrix 410 under control of controller 460. RF switch matrix 410 of embodiments of the invention provides for channel multiplexing, splitting, and/or combining so as to provide output of signals to each of optical transmitters 421*a*-421*d* containing all channels selected by delivery point equipment associated with each such optical transmitter. Accordingly, signals output by any of modulators 401*a*-401*d* may be coupled to multiple ones of optical transmitters 421*a*-421*d* by RF switch matrix 410. Likewise, multiple transmissions of a same content signal stream, modulated in a different digital logical channel and/or different RF channel, may be provided to accommodate selections by the various deliver point equipment. For example, where channel grouping cannot be accomplished which allows overlapping channel groupings for various delivery point equipment that has selected a same signal, that signal may appear within different RF channels, as controlled by controller 460, to accommodate channel paring as described herein.

Controller 460 of preferred embodiments provides transmission of operations signaling to various network nodes. For example, controller 460 may provide signaling to EF-OTN 422 to tune to a particular center frequency (e.g., a center frequency of 1.750 MHz in the foregoing example) in order to place the 3 RF channels carrying the selected signals within the passband of EF-OTN 422. Controller 460 may additionally provide signaling to delivery point equipment, such as set-top boxes 251*a*-251*c*, to facilitate their tuning to an RF channel and/or digital logical channel carrying a signal selected by that equipment (e.g., set-top box 251*a* may be instructed to tune to RF channel 7, logical digital channel 5, set-top box 251*b* may be instructed to tune to RF channel 2, logical digital channel 2, and set-top box 251*c* may be instructed to tune to RF channel 9, logical digital channel 10, in order to recover the signals selected by each).

It should be appreciated that the changes made to network infrastructure in order to implement a EF-PON of embodiments of the invention may be appreciably small in the overall network. For example, where SDV architecture has already been implemented, upgrading to an embodiment of EF-PON 400 shown in FIG. 4 may be accomplished by replacing 1 GHz optical transmitters 121*a*-121*d* with 2 GHz optical transmitters 421*a*-421*d*, replacing 1 GHz OTNs 122 with 2 GHz EF-OTNs 422, either replacing or supplementing 1 GHz modulators 101*a*-101*d* with 2 GHz modulators 401*a*-401*d*, and providing controller 460 to provide RF switch matrix control, selection of channel modulation schemes, selection of channel grouping, and control of the modulators as described herein. Various other infrastructure may additionally be upgraded, such as coaxial cables, switch matrixes, etc., where that infrastructure will not accommodate the increased transmission bandwidth of embodiments of the invention. The upgrading or replacing of such network infrastructure is likely to be more acceptable to network operators than an upgrade path that implicates upgrading subscriber equipment. For example, there are fewer devices in the network and their upgrading is likely to have less of an impact on the subscribers, both in cost and convenience.

Due to channel grouping provided by controller 460 and frequency translation performed by EF-OTN 422 of embodiments of the invention, the signals selected by delivery point equipment will be disposed within a predefined bandwidth (e.g., 100 MHz) at a known or selectable portion of the spectrum (e.g., 54-154 MHz) which is directly accessible to the delivery point equipment. The foregoing may be leveraged to provide a number of advantages. For example, although legacy subscriber equipment having 54-1000 MHz tuning capability may be readily used, future subscriber equipment may be produced with substantially simplified tuners (e.g., without requiring highly linear operation throughout an approximately 1 GHz bandwidth) where the output band of EF-OTN 422 is fixed or held to within a relatively narrow range. Accordingly, low cost, low performance tuners may be utilized by subscriber equipment according to embodiments of the invention. Additionally, transmission bandwidth capacity on the coaxial cable links of the subscriber site may be made available for other uses, such as local area network (LAN) connections within the subscriber site. For example, where the output band of EF-OTN 422 is fixed at the low end of the spectrum (e.g., 54-154 MHz), the higher end of the spectrum may be utilized to provide Ethernet connections within the subscriber site.

In providing channel paring according to embodiments of the invention, controller 460 preferably operates not only to consider modulating selected signals in RF channels which are disposed within a range of frequencies corresponding to the passband of EF-OTN 422, but also operates to consider channel selections made by a plurality of delivery points, particularly where those delivery points are disposed upon a same optical network portion associated with each of optical transmitters. For example, subscriber equipment disposed at 2 different delivery points (subscriber sites) may select a same signal. Rather than modulating the same signal in a plurality of RF channels for use by different delivery points, it is more efficient to provide intelligent channel grouping such that a modulated signal may be shared by a plurality of delivery points. Accordingly, controller 460 may operate to control modulation of the signal such that the same RF channel is passed by EF-OTNs of each such delivery point. The foregoing may be accomplished by modulating all signals for each such delivery point in the same band or by modulating the signals such that overlapping portions of the bands frequency translated by the EF-OTNs contain the shared signal.

Intelligent grouping of channels according to embodiments of the invention may include shifting modulation during use of a signal by one or more delivery points. For example, an initial channel grouping scheme may be adequate to accommodate a first group of subscriber equipment's sharing of a particular signal. However, additional subscriber equipment selecting that signal may be served by reorganizing the channel grouping scheme such that all subscriber equipment of this new group may share the signal. Because there is likely to be some latency in the various tuners tuning to and acquiring the signal, such reorganization of channel groupings of certain signals, such as those providing streaming video and/or audio, are preferably minimized to avoid brief blanking or other artifacts perceptible to a user. However, embodiments of the invention are expected to transmit a substantial amount of data traffic, such as computer network traffic, which may be more readily subject to channel grouping reorganization without being perceptible to a user or otherwise appreciably degrading performance.

In order to facilitate intelligent channel grouping, with a minimum of channel grouping reorganization, embodiments of the invention operate to leave channel openings (e.g., unused RF channels and/or logical digital channels) throughout the spectrum. For example, intelligence of controller 460 may operate to control modulators 401*a*-401*d* to leave some percentage (e.g., 10%) of the logical digital channels unused as channel grouping schemes are initiated. Thereafter, as subscriber equipment channel selections change, these unused channels may be utilized to accomplish efficient channel groupings. Other channels carrying signals which are no longer selected may likewise be temporarily unused for use in efficient channel groupings. Although leaving portions of the spectrum unused initially appears to be inefficient, inefficiencies associated with judicious use of such channel openings is expected to be outweighed by the transmission bandwidth efficiencies provided by the increased transmission bandwidth and/or intelligent channel groupings provided according to embodiments of the present invention.

From the foregoing it can be appreciated that controller 460 and controller 560 of embodiments include processing capability operating as described herein. For example, controller 460 and controller 560 may comprise a general purpose processor or an application specific integrated circuit (ASIC) operating under control of an instruction set defining operation as described herein.

Although embodiments have been described above with reference to a single tuner circuit providing frequency translation of signals to a band directly accessible to subscriber equipment, concepts of the present invention are applicable to other configurations of EF-OTNs. For example, an EF-OTN of embodiments of the invention may comprise a plurality of tuner circuits (e.g., multiple tuner circuits 521) to provide frequency translation as described herein. Such multiple tuner circuits may be used in place of the use of the foregoing channel grouping, such as where one tuner circuit is provided in an EF-OTN for each subscriber equipment at an associated delivery point. Additionally or alternatively, multiple EF-OTN tuner circuits may be used to simplify implementation of channel grouping, such as to use 2 tuner circuits in each EF-OTN to accommodate all signals selected by subscriber equipment of a delivery point not being modulated in RF channels within the passband of one tuner.

It should be appreciated that, although an illustrative embodiment has been described herein with respect to a EF-PON of the present invention doubling the transmission bandwidth of a PON architecture, concepts of the present invention are not limited to use with respect to the particular transmission bandwidths discussed. For example, where optical transmitters and other fiber-optic infrastructure supports bandwidths beyond 2 GHz, such increased bandwidths may be utilized according to embodiments of the invention.

Moreover, concepts of the present invention have applicability outside of facilitating increased transmission bandwidth. For example, channel grouping and frequency translation may be utilized with traditional transmission bandwidths of 1 GHz or less in order to place signals selected by subscriber equipment in lower frequency ranges (e.g., 54-154 MHz) in order to free bandwidth of the subscriber site coaxial cable links, such as to provide Ethernet network connections or other subscriber site uses via the coaxial cables.

Although the present invention and its advantages have been described in detail, it should be understood that various chances, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
an extended frequency optical transition node having an optical interface adapted to couple to a fiber-optic cable transmission network link and a radio frequency (RF) interface adapted to couple to a subscriber site RF link, said extended frequency optical transition node having a tuner circuit operable to provide frequency translation of selected signals carried by said fiber-optic cable transmission network link modulated at frequencies outside of a tuning capability of subscriber equipment to frequencies within said tuning capability of said subscriber equipment,
wherein said subscriber equipment comprises equipment configured to operate with respect to a switched digital video (SDV) passive optical network (PON) having a transmission bandwidth of 1 GHz, and wherein said frequency translation of selected signals by said extended frequency optical transition node is transparent to said subscriber equipment.

2. The system of claim 1, wherein said tuning capability of said subscriber equipment is 1 GHz or below, and wherein said frequencies outside of said tuning capability of said subscriber equipment are above 1 GHz.

3. The system of claim 1, wherein said subscriber equipment comprises a set-top box.

4. The system of claim 1, wherein said subscriber equipment comprises a television set.

5. The system of claim 1, wherein said subscriber equipment comprises a cable modem.

6. The system of claim 1, wherein said tuner circuit has a passband selected to be broad enough to pass a plurality of RF channels transmitted via said fiber-optic cable transmission network.

7. The system of claim 6, wherein said passband is at least 100 MHz.

8. The system of claim 6, wherein said plurality of RF channels is at least 4 RF channels.

9. The system of claim 1, wherein said tuner circuit comprises a multi-conversion tuner circuit.

10. The system of claim 9, wherein said multi-conversion tuner circuit comprises a double conversion tuner circuit.

11. The system of claim 9, wherein a plurality of mixers of said multi-conversion tuner circuit are disposed in a same integrated circuit.

12. The system of claim 11, further comprising an optical transition circuit operable provide conversion of signals carried by said fiber-optic cable transmission link to RF signals, wherein at least a part of said optical transition circuit is disposed in said same integrated circuit.

13. The system of claim 1, further comprising:
a head-end controller operable to provide channel paring of said signals such that a plurality of signals utilized by subscriber equipment associated with said extended frequency optical transition node are all modulated within a frequency band no broader than a passband of said tuner circuit.

14. The system of claim 13, wherein said tuner circuit comprises a tuner controller operable to control said tuner circuit to place said frequency band in said passband of said tuner circuit.

15. A system comprising:
an extended frequency optical transition node having an optical interface adapted to couple to a fiber-optic cable transmission network link and a radio frequency (RF) interface adapted to couple to a subscriber site RF link, said extended frequency optical transition node having a tuner circuit operable to provide frequency translation of signals carried by said fiber-optic cable transmission network link to selected frequencies output on said subscriber site RF link; and
a head-end controller operable to provide channel paring of said signals such that a plurality of signals utilized by subscriber equipment associated with said extended frequency optical transition node are all modulated within a frequency band no broader than a passband of said tuner circuit.

16. The system of claim 15, wherein said tuner circuit operates in accordance with a signal provided by said head-end controller to adjust a tuning frequency of said tuner circuit.

17. The system of claim 16, wherein said tuner circuit comprises a tuner controller operable to control said tuner circuit to place said frequency band in said passband of said tuner circuit in accordance with said head-end controller signal.

18. The system of claim 15, wherein said passband of said tuner circuit is at least 100 MHz.

19. The system of claim 15, wherein said passband of said tuner circuit passes at least 4 RF channels.

20. The system of claim 15, wherein said optical interface accepts a signal having greater than 1 GHz bandwidth.

21. The system of claim 20, wherein said signal has at least a 2 GHz bandwidth.

22. The system of claim 20, wherein said RF interface outputs a signal having less than 1 GHz bandwidth.

23. The system of claim 15, wherein said optical interface is adapted to accept a signal having a bandwidth greater than a tuning bandwidth of said subscriber equipment and said RF interface is adapted to output a signal having a bandwidth the same or less than the tuning bandwidth of said subscriber equipment.

24. The system of claim 15, wherein said tuner circuit comprises a multi-conversion tuner circuit.

25. The system of claim 24, wherein said multi-conversion tuner circuit comprises a double conversion tuner circuit.

26. A method comprising:
receiving information regarding a plurality of signals selected by subscriber equipment disposed at a subscriber site; and
controlling modulation of signals at a cable head-end to provide channel groupings such that said plurality of signals selected by subscriber equipment are modulated in RF channels falling within a selected bandwidth, said selected bandwidth being only a portion of available network transmission bandwidth.

27. The method of claim 26, wherein said selected bandwidth comprises a bandwidth corresponding to a passband of an extended frequency optical transition node receiving said RF channels.

28. The method of claim 26, wherein said available network transmission bandwidth is approximately 1 GHz and said selected bandwidth is approximately 100 MHz.

29. The method of claim 26, wherein said available network transmission bandwidth is greater than 1 GHz and said selected bandwidth is approximately 100 MHz.

30. The method of claim 26, further comprising:
converting said RF channels to an optical signal;
transmitting said optical signal to said subscriber site via a fiber-optic network link;

converting said optical signal to said RF channels at said subscriber site;

translating frequencies of said RF channels to a selected band of RF channels within a tuning range of said subscriber equipment, said selected band of RF channels being different than a band said RF channels were modulated in; and outputting said selected band of RF channels on a subscriber site RF link coupled to said subscriber equipment.

31. The method of claim 30, wherein said band said RF channels were modulated in is outside said tuning range of said subscriber equipment.

32. The method of claim 30, further comprising:

multiplexing additional subscriber signals on said RF link coupled to said subscriber equipment.

33. The method of claim 32, wherein said additional subscriber signals comprise local area network signals passed between systems disposed at said subscriber site.

34. A method comprising:

converting an optical signal received at a subscriber site to a plurality of RF channels;

translating frequencies of said RF channels to a selected band of RF channels within a tuning range of a subscriber equipment disposed at said subscriber site, said selected band of RF channels being different than a band said RF channels were modulated in; and outputting said selected band of RF channels on a subscriber site RF link coupled to said subscriber equipment;

receiving information regarding a plurality of signals selected by said subscriber equipment disposed at said subscriber site;

controlling modulation of signals at a cable head-end to provide channel groupings such that said plurality of signals selected by subscriber equipment are modulated in said RF channels falling within a selected bandwidth, said selected bandwidth being only a portion of available network transmission bandwidth;

converting said RF channels to an optical signal; and transmitting said optical signal to said subscriber site via a fiber-optic network link.

35. The method of claim 34, wherein said band said RF channels were modulated in is outside said tuning range of said subscriber equipment.

36. The method of claim 34, wherein said tuning range of said subscriber equipment is 1 GHz or less.

37. The method of claim 36, wherein a transmission bandwidth of said optical signal received at said subscriber site is greater than 1 GHz.

38. The method of claim 34, wherein said selected bandwidth comprises a bandwidth corresponding to a passband of an extended frequency optical transition node receiving said RF channels.

39. The method of claim 34, wherein said available network transmission bandwidth is approximately 1 GHz and said selected bandwidth is approximately 100 MHz.

40. The method of claim 34, wherein said available network transmission bandwidth is greater than 1 GHz and said selected bandwidth is approximately 100 MHz.

* * * * *